(12) United States Patent
Shoki

(10) Patent No.: US 6,172,764 B1
(45) Date of Patent: Jan. 9, 2001

(54) INK JET PRINTER

(75) Inventor: Mikio Shoki, Daito (JP)

(73) Assignee: Funai Electric Co., Ltd., Osaka (JP)

( * ) Notice: Under 35 U.S.C. 154(b), the term of this patent shall be extended for 0 days.

(21) Appl. No.: 09/042,596

(22) Filed: Mar. 16, 1998

(30) Foreign Application Priority Data

Mar. 18, 1997 (JP) .................................................. 9-064175

(51) Int. Cl.[7] .................................................. G06F 15/00
(52) U.S. Cl. ........................ 358/1.15; 358/1.1; 358/1.13; 358/1.14
(58) Field of Search ..................... 395/112, 113, 395/114; 358/298, 296, 501, 502, 1.13, 1.14, 1.15, 1.1, 1.4, 1.12; 347/3, 4, 5

(56) References Cited

U.S. PATENT DOCUMENTS 5,680,596 * 10/1997 Iizuka et al. ........................ 395/559
5,694,618 * 12/1997 Hibino .................................. 395/866
5,710,939 * 1/1998 Ballachino et al. .................. 395/821

* cited by examiner

Primary Examiner—Edward L. Coles
Assistant Examiner—Mark Wallerson
(74) Attorney, Agent, or Firm—Lackenbach Siegel Marzullo Aronson & Greenspan

(57) ABSTRACT

An ink jet printer includes an MPU for outputting 1 byte of reverse data. This reverse data is loaded onto a reverse data register. Low nibble data in 4 bits is set to a data switch in response to a "state 1" control signal from a status control. Responsive to a "state 6" control signal, high nibble data in 4 bits is set to the data switch. Thus, the reverse data, configured by 8 bits in the "state 1" and "state 4", is sent on a 4-bit basis to a host computer.

5 Claims, 5 Drawing Sheets

INK JET PRINTER

BACKGROUND OF THE INVENTION

1. Field of the Invention

This invention relates to ink jet printers. More particularly, this invention is concerned with an ink jet printer, wherein a host computer supplies, through device drivers, print commands and print data to an ink jet printer so that they are processed by an MPU (Microprocessor Unit) and an ASIC (Application Specific Integrated Circuit) to thereby control ink jet nozzles, a carrier and a feed motor.

2. Description of the Prior Art

Printers connected to a host machine generally require transmission of various data (reverse data) to the host machine through bi-directional communications according to IEEE1284. Particularly ink jet printers require transmission of reverse data to the host machine at least in a nibble mode.

There proposed is a technology disclosed, for example, in Japanese Patent Laying-open No. H1-142924 (Jun. 5, 1989), etc. in order to meet these requirements due to a standard. In this technology, status signals are sent back to a host machine, under the control of an MPU, through a Centronics (commodity name) of an 8-bit parallel signal line.

In the prior art, however, the MPU suffers from a heavy burden because the reverse data is sent back to the host under the control of the MPU provided in the printer. Accordingly, there has been a necessity of mounting on a printer a high-speed, expensive MPU in order to achieve high-speed processing.

SUMMARY OF THE INVENTION

Therefore, it is a primary object of this invention to provide a novel ink jet printer.

It is another object of this invention to provide an ink jet printer that is inexpensive but capable of performing high-speed processing.

This invention is an ink jet printer, connected to a host machine through a parallel signal line of a predetermined number of bits, and including a microprocessor, wherein reverse data is sent in a nibble mode from the microprocessor to the host machine through the parallel signal line, comprising: a reverse data register for receiving reverse data having the number of bits greater than the predetermined number of bits from the microprocessor; a state-transitional signal creating means for creating a state transitional signal based on a particular signal from the host machine; and a data switch for receiving to send onto the bus signal line, a first portion and a second portion of the reverse data respectively having the number of bits smaller than the predetermined number of bits at different timings in response to the state transitional signal.

The reverse data is, for example, 8 bits and the reverse data register is also 8 bits so that the reverse data can be loaded onto the reverse data register at one time. On the other hand, the number of the parallel signal lines is, for example, 4 bits. Accordingly, the first portion and the second portion of the reverse data, each having 4 bits, are supplied to the data switch at different timings depending upon the state transitional signals from the state transitional signal creating means. Therefore, the data switch can send totally 8 bits of the reverse data, 4-bits by 4-bits, back to the host machine by rendering each parallel signal line active or inactive.

According to this invention, by merely setting reverse data to the reverse data register by the microprocessor of the printer, the data switch can transmit the reverse data to the host machine. There is no necessity of involvement by the microprocessor each time reverse data is sent back, thus reducing the burden on the microprocessor as compared to the prior art. High speed processing is possible even when an inexpensive microprocessor is employed.

Further, according to this invention, even if the parallel signal lines are less in number, the total bits of the reverse data can be sent back to the host machine only by once setting the reverse data to the register.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1A:
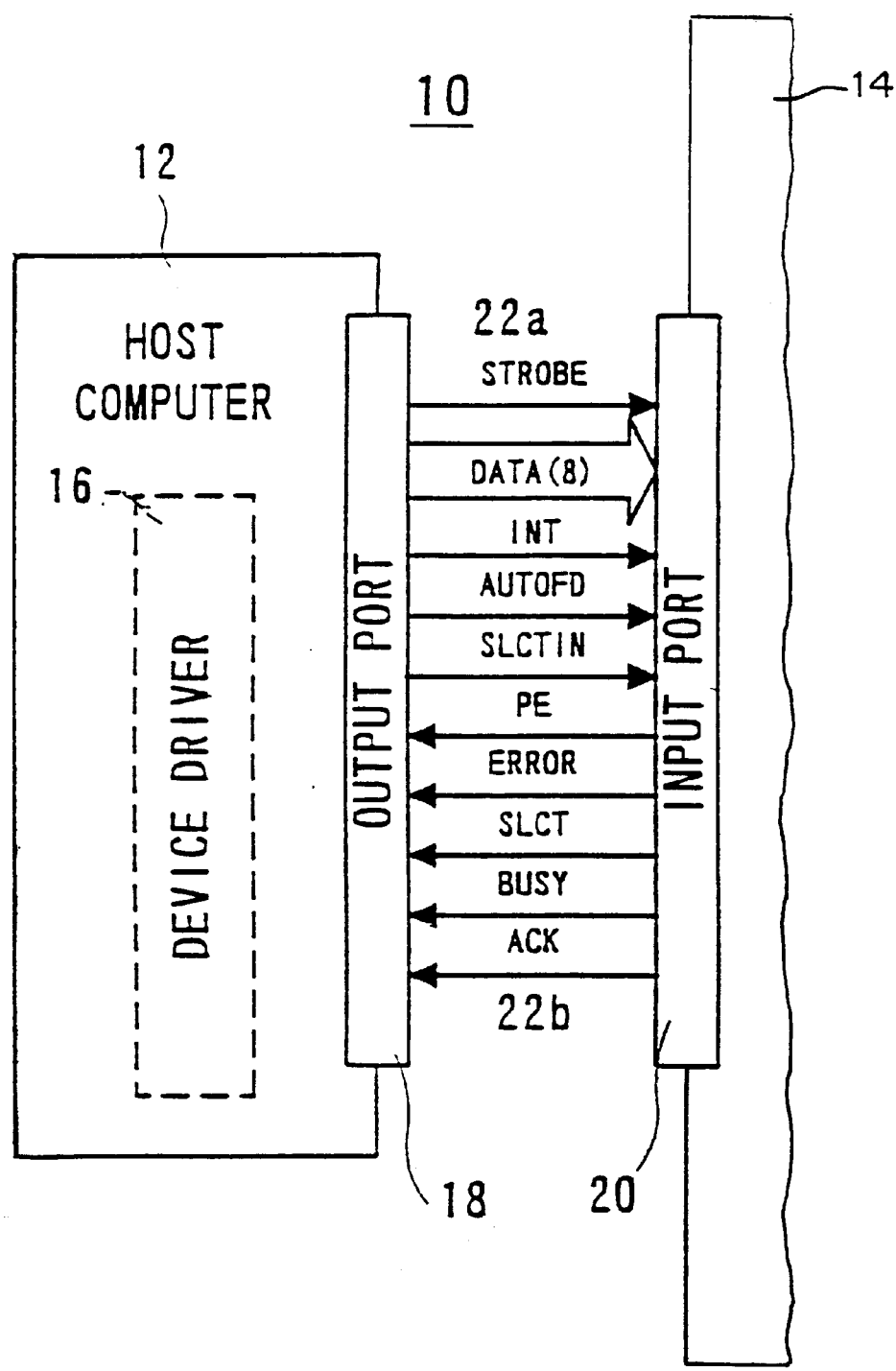
FIG. 1 is a block diagram showing one embodiment of this invention.
Figure 1B:
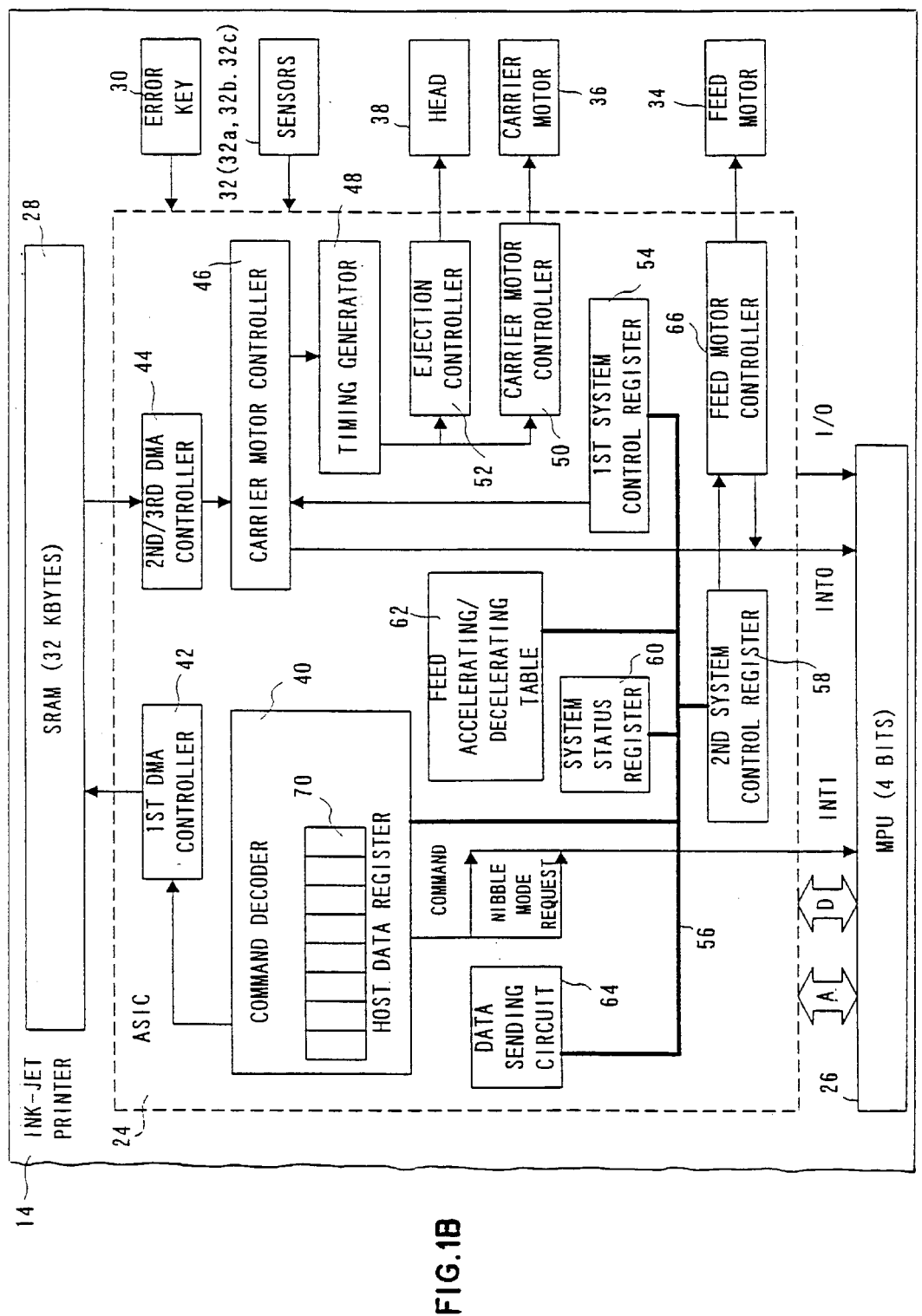

Referring to FIG. 1, an ink jet printer system 10 of this embodiment includes a host computer 12 and an ink jet printer 14. The host computer 12 is a computer compatible with "Windows", and includes a device driver 16. The device driver 16 is a firmware for interfacing between the host computer 12 and the ink jet printer 14, and possesses such functions, as well known, as conversion of character data into bit-map data, conversion of bit-map data into nozzle data, and so on so that the nozzle data is supplied, together with required print commands, to the ink jet printer 14.

A printer cable or data cable 22, such as a parallel interface "Centronics" or a serial interface "232C", is connected between an output port 18 of the host computer 12 and an input port 20 of the ink jet printer 14. The data cable 22 includes a first signal line group 22a formed by a 1-bit strobe (STROBE) signal line, an 8-bit data (DATA) line, a 1-bit interrupt (INT) signal line, a 1-bit auto-feed (AUTOFD) signal line, and a 1-bit select (SLCTIN) signal line, in order to transmit data and signals from the host computer 12 to the ink jet printer 14. The data cable 22 also includes a second signal line group 22b formed by a printer error (PERIPHERY) signal line, an error (ERROR) line, a select-in (SLCI) signal line, a busy (BUSY) signal line, and an acknowledge (ACK) signal line, each of which configured by 1 bit.

The ink jet printer 14 includes an ASIC 24 and an MPU 26. The MPU 26, in this embodiment, is for example a 4-bit MPU, for the purpose of reducing the cost for the ink jet printer 14. The ASIC 24 has a circuit scale, for example, of approximately 15000 gates, and connected to the MPU 26 as well as an SRAM 28 (e. g. 32 K bites). The SRAM 28, in this embodiment, is utilized not only as a buffer for print data (nozzle data) but also an accelerating/decelerating table for the printer carrier.

The ASIC 24 receives signals from an error key 30 and sensors 32. The error key 30 is utilized to release an error. If an error such as paper jamming occurs, it is possible to get out of the error state by operating the error key after removing the paper. The sensors 32 includes a home-position sensor 32a for detecting whether the carrier (not shown) is returned to its home position or not, a paper sensor 32b for detecting that a print paper is existing on a transport path (not shown), and a paper sensor 32c for detecting that a print paper is present at a paper feed section (not shown). Incidentally, the transport path includes a supply path along which a print paper is supplied toward a nozzle head, i.e. a print position, and an exit path through which a print paper is fed from the nozzle head toward an exit port (not shown). That is, the paper sensor 32b is provided on both the supply path and the exit path, so as to be turned on when a paper is present on any of the paths. Also, the paper sensor 32c is on while paper exists at the paper feed section.

The ASIC 24 supplies control signals to a feed motor 34, a carrier motor 36 and a print head 38. The feed motor 34, in this embodiment, is structured by a stepping or pulse motor, so that it drives a feed roller (not shown) to feed a paper to the print position, moves the paper in a sub-scanning direction in order, or discharge the paper from the print position. The carrier motor 34 is a motor for driving a carrier (not shown) to move the print head 38 in a main scanning direction, and, in this embodiment, is structured by a stepping or pulse motor.

The ASIC 24 includes a command decoder 40. This command decoder 40 controls the flow of three kinds of data, e.g. a command, a nibble mode request signal and data (nozzle data) for printing stored in the SRAM 28.

Explaining in brief, the command data 40 makes an interruption (INT1) to the MPU 26 when an 8-bit command is inputted thereto from the host computer 12. The command decoder 40 also monitors a head byte of the 8-byte command. If the head byte has a head bit (bit number 7) of "1", the command decoder 40 sets, to a first DMA controller 42, an address and a data length to be transferred to the SRAM 28. The first DMA controller 42, each time the data required for printing and to be stored in the SRAM 28 is inputted from the host computer 12 through a selector 68 (to be stated later), writes the data 1-byte-by-1-byte to the SRAM 28.

A negotiation phase in a nibble mode, to be stated later, is executed, in order to enable data transfer in a reverse direction, i. e. from the printer 14 to the host computer 12, to respond to a device ID request from the host computer 12 under the "Windows" environment. To achieve this, the host computer 12 sends out "1" and "0" respectively to the select-in signal line and the auto-feed signal line of the first signal line group 22a, to inform the printer 14 that a negotiation phase is started. Due to this, the command decoder 40 recognizes that a nibble mode request is outputted by the host computer 12, and makes an interrupt (INT0) to the MPU 26. The MPU 26 receives, by the interruption, only 1 byte of a required extensibility request value from the command decoder 40.

The data in the SRAM 28 is read out by a second/third DMA controller 44 included in the ASIC 24, and then supplied to a carrier motor controller 46. The carrier motor controller 46 controls timing of ejection at nozzles (not shown) of the print head 38, basically, while controlling a drive pulse to the carrier motor 36. Timing pulses are outputted from a timing generating circuit 48 to a motor controller 50 and an ejection controller 52, in order to provide detailed timing control for the carrier motor 34 and the print head 38. In response to the timing pulse, the motor controller 50 creates a drive signal that is capable of actually driving a motor driver (not shown). The ejection controller 52, responds to the timing pulse to create a drive signal for actually driving a nozzle driver (not shown).

The ASIC 24 further includes a first system control register 54 having, for example, 8 bits. The first system control register 54 supplies control data for controlling the carrier motor 34 to the carrier motor controller 46. The first system control register 54 is connected, via a bus 56, to a second system control register 58, a system status register 60, a feed accelerating/decelerating table 62 and a data sending circuit 64 for use in a nibble mode, and the command decoder 40 and the MPU 26.

The second system control register 58 supplies data for controlling a feed motor 36 to a feed motor controller 66, according to accelerating/decelerating data from a feed accelerating/decelerating table 62, etc. The system status register 60 is, for example, 8 bits, and supplies data representative of a system overall status to the MPU 26. A parallel port register 64 notifies a status of the ink jet printer 14, e. g. the data of busy, PE error, select, hold, acknowledge, etc., to the host computer 12 through the signal line group 22b. This data sending circuit 64 is also utilized to transmit required data, from the ink jet printer 14 to the host computer 12, during a negotiation phase upon shifting from a compatibility mode to a nibble mode.

Figure 2A:
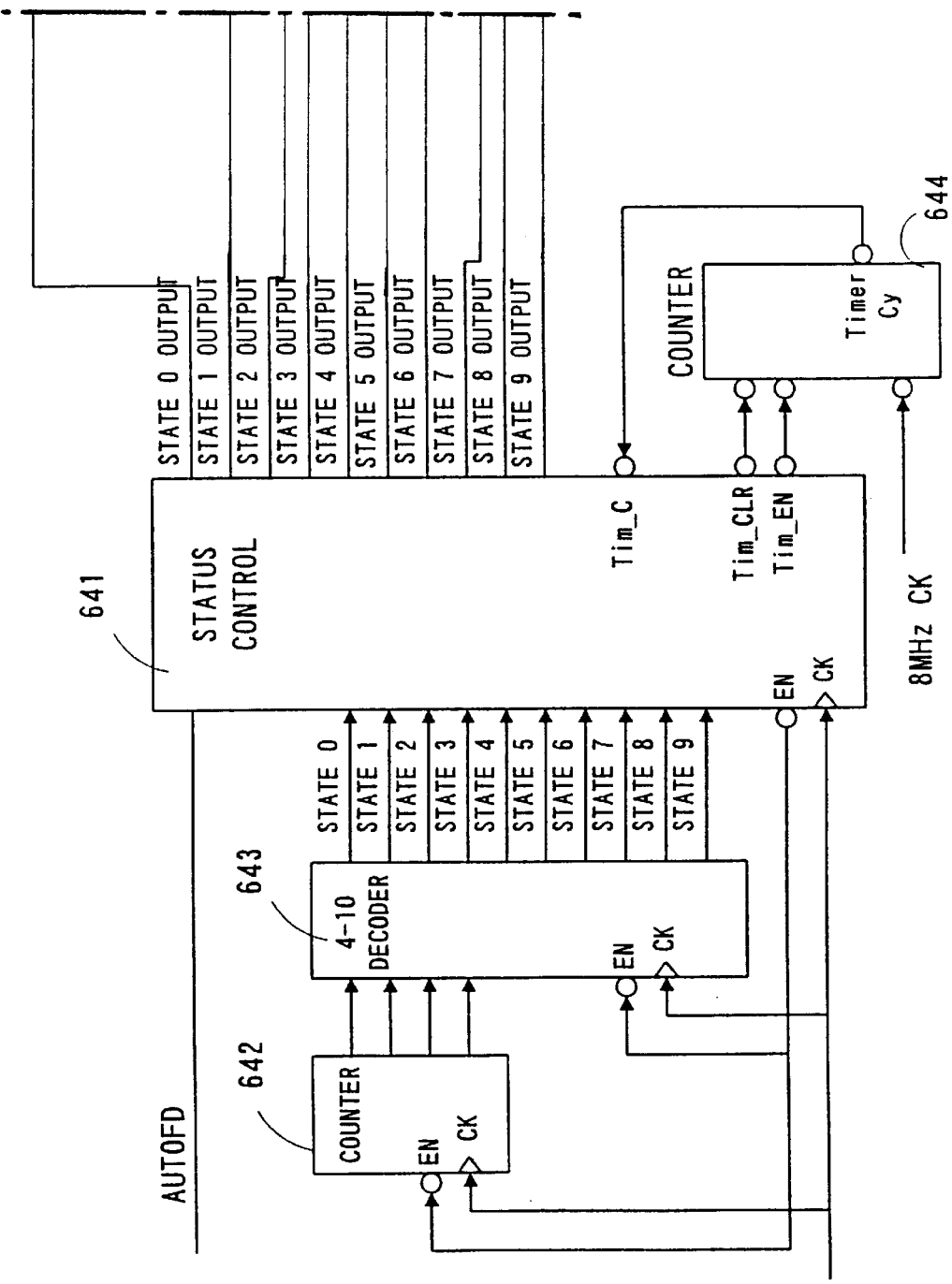
FIG. 2 is a block diagram showing in detail a data sending circuit in the FIG. 1 embodiment.
Figure 2B:
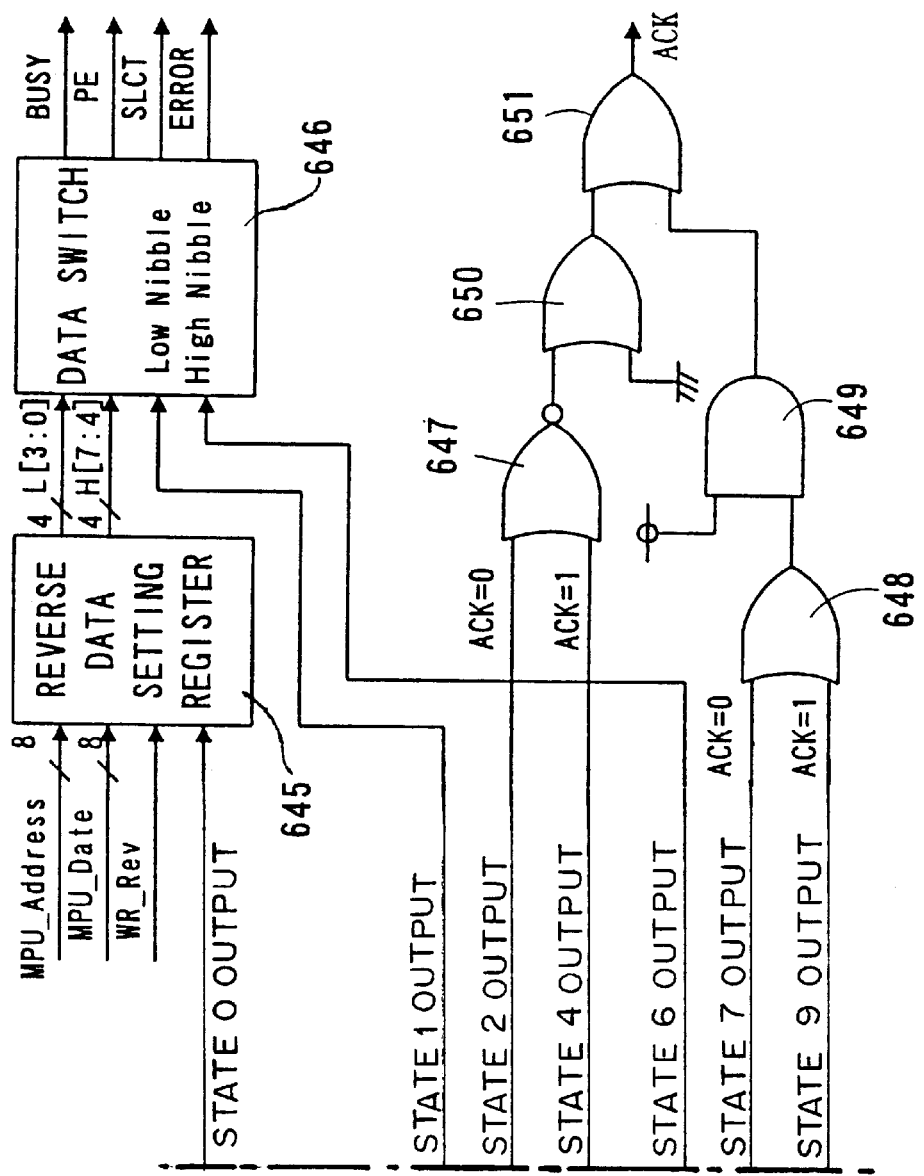

The data sending circuit 64 of the FIG. 1 embodiment includes a status control 641 as shown in detail in FIG. 2. This status control 641 receives an AUTOFD signal from the device river 16 of the host computer 12. The status control 641 receives, at its clock terminal CK, a system clock, similarly to a 4-bit counter 642 and a 4-10 decoder 543. The status control 641 also supplies an enable (EN) signal to the counter 642 and the decoder 640. The status control 641 further supplies a clear (Tim_CLR) signal and an enable (Tim_EN) signal to a timer counter 644. This timer counter 644 receives a clock of a predetermined frequency, e. g. 8 MHz, to give a timer (Tim_C) signal to the status control 641 at each predetermined time.

The counter 642 is incremented in response to the clock so that its count value is supplied as 4-bit data to the decoder 643. The decoder 643 is, for example, a ROM decoder, and decodes the 4-bit count value to output status signal of from state 0 to state 9. The status signals from the decoder 643 is given to the status control 641 so that the status control 641 outputs status control signals from state 0 to state 9 based on these status signals, the above-stated auto-feed signal, and timer signal from the timer counter 644.

The state 0 of the status control signal is supplied as an enable signal from the status control 641 to a reverse data setting register 645. The reverse data setting register 645 is also supplied with an MPU address and MPU data each of 8 bits by the MPU 26 (FIG. 1) through the bus 56 (FIG. 1). The MPU data is written into the reverse data setting register 645 in response to a write (WR_Rev) signal supplied also from the MPU 26. That is, the MPU 26 sets the reverse data to be sent to the host computer 12 into the reverse data setting register 645.

The reverse data setting register 645 has a 4-bit output bus. Through the output bus, the reverse data setting register 645 devide the 8-bit reverse data into two so as to supply the reverse data on a 4-bit basis. For this reason, this data switch 646 is supplied by the state-1 and state-6 control signals respectively as low-nibble and high-nibble switching signals. That is, the data switch 646 receives lower-order 4 bits of the 8-bit reverse data stored in the register 645 when it is supplied by the state-1 control signal, while the data switch 646 receives upper-order 4 bits of the 8-bit reverse data when supplied with the state-6 control signal. The data switch 646 sets the four signal lines, i.e. BUSY, PE, SLCT and ERROR, included in the signal line 22b to predetermined logical states ("1" or "0") depending upon the 4-bit reverse data, thereby sending back reverse data to the host computer 12.

The state-2 control signal and the state-4 control signal are supplied from the status control 641 to a NOR gate 647, while the state-7 control signal and the state-9 control signal are supplied from the status control 641 to an OR gate 648. The OR gate 648 has an output supplied to one input of an AND gate 649. The other input of the AND gate 649 is normally at a high level or "1". The NOR gate 647 has an output that is supplied to one input of an OR gate 650. The other input of the OR gate 650 is normally at a low level or "0". The AND gate 649 and the OR gate 650 have their outputs that are inputted to respective inputs of an OR gate 651. Consequently, the OR gate 651 outputs an acknowledge signal ACK that becomes a high or low level at predetermined timing. This acknowledge signal is sent back to the device driver 16 of the host computer 12 through a signal line ACK included in the signal line group 22b.

Figure 3:
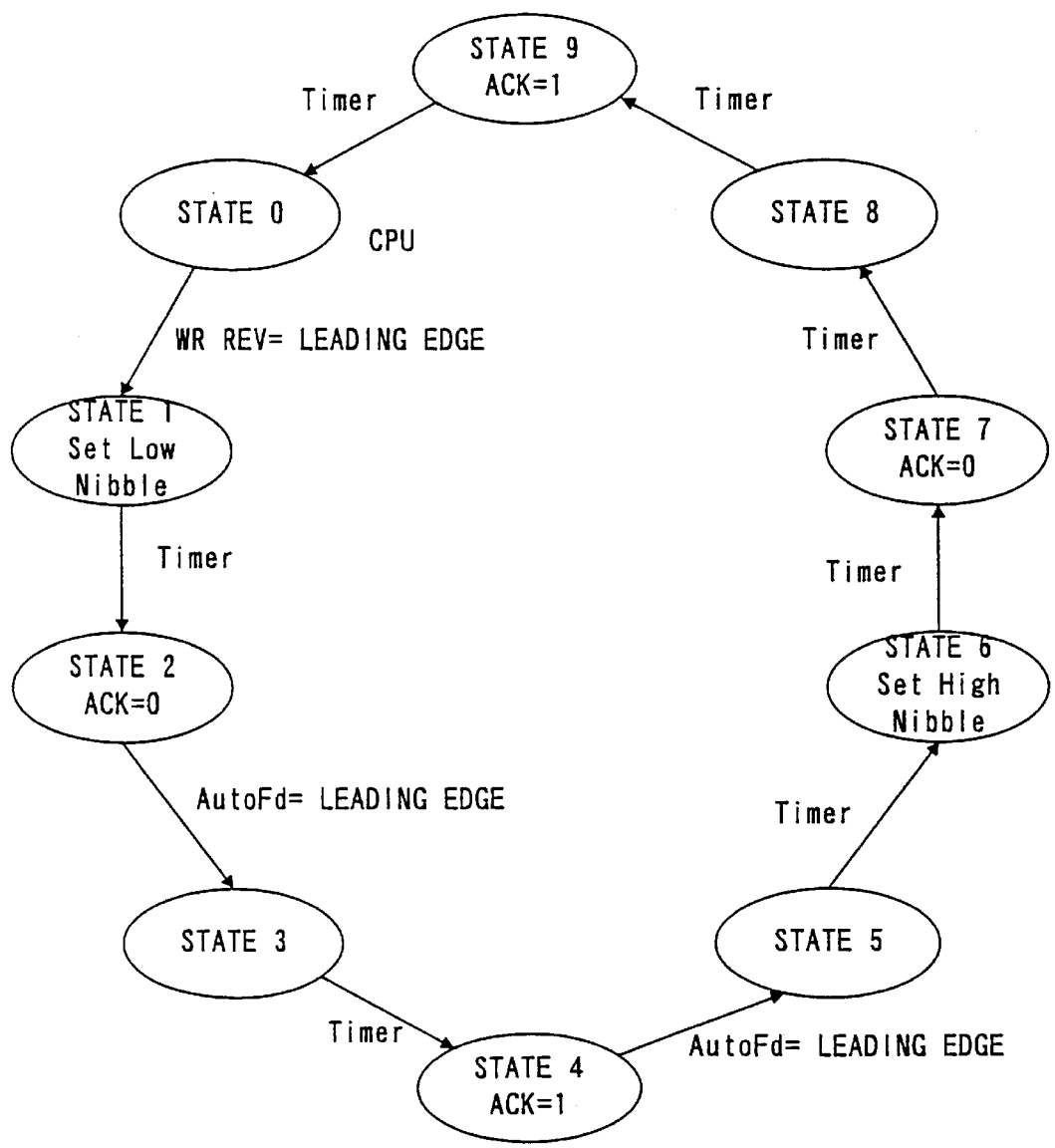
FIG. 3 is an illustrative diagram showing status transitions executed by a state control in FIG. 2.

Referring to FIG. 3 showing a state transition diagram, the operation of this embodiment will be explained hereinbelow.

If an enable signal is outputted from the status control 641, the counter 642 and the decoder 643 are brought into an enable state. At this time, the counter 642 assumes a count value "0". Accordingly, the decoder 643 outputs a state-0 signal, and the status control 641 outputs a state-0 control signal. In response thereto, the reverse data setting register 645 is enabled so that 1-byte or 8-bit reverse data supplied from the MPU 26 to the bus 56 is loaded onto the reverse data setting register 645. Note that the writing of the reverse data into the register 645 is performed during a fall of the writing signal.

Thereafter, when a clock is inputted, the counter 642 counts "1". In response thereto, a state-1 signal is outputted from the decoder 643, and a state-1 control signal is outputted from the status control 641. Accordingly, a low nibble is set. That is, although the reverse data setting register 645 is written with an 8-bit reverse data, in a nibble mode the reverse data can be sent only on a 4-bit unit basis to the host computer. First, a 4-bit low nibble is fetched from the reverse data setting register 645 to the data switch 646. Accordingly, the data switch 646 sends back low nibble data shown in table 1 to the host computer 12 via the signal lines BUSY, PE, SLCT or ERROR.

TABLE 1

| Status | State | 0 1 | 1 2 | 2 3 | 3 4 | 4 5 | 5 6 | 6 7 | 7 8 | 8 9 | 9 0 |
|---|---|---|---|---|---|---|---|---|---|---|---|
| SLCTIN | | — | — | — | — | — | — | — | — | — | — |
| AUTOFD | | — | — | 1 | — | 0 | — | — | 1 | — | — |
| STROBE | | — | — | — | — | — | — | — | — | — | — |
| ACK | | — | 0 | — | 1 | — | — | 0 | — | 1 | — |
| BUSY | | L3 | — | — | — | — | H7 | — | — | — | — |
| ERROR | | L0 | — | — | — | — | H4 | — | — | — | — |
| SLCT | | L1 | — | — | — | — | H5 | — | — | — | — |
| PE | | L2 | — | — | — | — | H6 | — | — | — | — |
| Low Nibble | | 1 | 0 | 0 | 0 | 0 | 0 | 0 | 0 | 0 | 0 |
| High Nibble | | 0 | 0 | 0 | 0 | 0 | 1 | 0 | 0 | 0 | 0 |
| Reverse Data Flag | | 1 | 1 | 1 | 1 | 1 | 1 | 1 | 1 | 0 | 0 |

When a timer counter 644 has counted a time required for sending back the low nibble data by the data switch 646, the timer counter 644 supplies a timer signal to the status control 641. Thereupon, the counter 642 has a count value "2", and a state-2 signal is being outputted from the decoder 643. The state control 641 outputs a state-2 control signal responsive to the timer signal.

When the state-2 control signal is outputted, a low level signal is outputted from the NOR gate 647. The low level signal is supplied as an acknowledge signal to the device driver 16 through the OR gates 650 and 651. The device driver 16 responds to the inputted low-level acknowledge signal to receive the low nibble data that is sent back from the data switch 646.

When the counter 642 counts "3" and the decoder 643 outputs a state-3 signal, a state-3 control signal is outputted from the status control 641 in response to a rise in an auto-feed signal from the device driver 16 of the host computer 12.

Thereafter, when the counter 642 counts "4" and a state 4 signal is outputted from the decoder 643, a state-4 control signal is outputted from the status control 641 in response to a timer signal from the timer counter 644.

In response to the state-4 control signal, a high level signal is outputted from the NOR gate 647. In response thereto, a high-level acknowledge signal is supplied from the OR gate 651 to the device driver 16. This prepares to send back high-order nibble data.

When the counter 642 counts "5" and a state-5 signal is outputted from the decoder 643, a state-5 control signal is outputted from the status control 641 in response to a lower in the auto-feed signal from the device driver 16 of the host computer 12.

When the counter 642 counts "5" and a state 5 signal is outputted from the decoder 643, a state 5 control signal is outputted from the status controller 641 in response to a fall in the auto-feed signal from the device driver 16 of the host computer 12.

Thereafter, when the counter 642 counts "6" and a state-6 signal is outputted from the decoder 643, a state-6 control signal is outputted from the status control 641 in response to a timer signal from the timer counter 644.

When the state-6 control signal is outputted from the status control 641, a high nibble is set. That is, a 4-bit high nibble is fetched from the reverse data setting register 645 to the data switch 646. Accordingly, the data switch 646 sends back high nibble data shown in table 1 to the host computer 12 through the signal lines BUSY, PE, SLCI and ERROR.

When the timer counter 644 has counted a time required for sending back the high nibble data by the data switch 646, the timer counter 644 supplies a timer signal to the status control 641. Thereupon, the counter 642 has a count value "7" and the decoder 643 outputs a state-7 signal. Accordingly, the status control 641 outputs a state 7 control signal in response to the timer signal.

When the state-7 control signal is outputted, a low level signal is outputted from an OR gate 648. The low level signal is supplied as a low-level acknowledge signal to the device driver 16 through an AND gate 649 and an OR gate 651. The device driver 16 responds to the inputted low-level acknowledge signal to receive the high nibble data sent back from the data switch 646.

When the counter 642 counts "8" and a state-8 signal is outputted from the decoder 643, a state-8 control signal is outputted from the status control 641 in response to arise in the auto-feed signal from the device driver 16 of the host computer 12.

Thereafter, when the counter 642 counts "9" and a state-9 signal is outputted from the decoder 643, a state-9 control signal is outputted from the status control 641 in response to a timer signal from the timer counter 644.

When the state-9 control signal is outputted, the OR gate 648 outputs a high level signal. The high level signal is supplied as a high-level acknowledge signal to the device driver 16 through the AND gate 649 and the OR gate 651. The device driver 16, when inputted by the high-level acknowledge signal, prepares to send back the succeeding byte (8-bit) data.

Thereafter, when the counter 642 becomes "0", the status control 641 outputs a state-0 control signal in response to a timer signal from the timer counter 644. Thereafter, the sending back of reverse data is carried out in the nibble mode, by a similar operation to the above.

In this manner, during sending back the reverse data, the MPU 26 merely sets 1-byte reverse data to the reverse data setting register 645, and then status control 641 causes an automatic transition of status, thereby automatically sending back the reverse data on the 4-bit basis to the host computer 12. That is, there are less occasions of involvement by the printer CPU or MPU. Therefore, the CPU or MPU is released of burden imposed thereon. It is therefore possible to carry out printing operations at high speed without using a high-speed CPU or MPU. Thus, a high speed printer can be offered at low cost.

Even if the reverse data is 8 bits (1 byte) and the sending-back signal line is 4 bits, that is, even if the reverse data has the number of bits greater than that of the sending-back signal line, sending back is automatically made at different timings.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ink jet printer, connected to a host machine through parallel signal lines of a predetermined number of bits, and including a microprocessor, wherein reverse data is sent in a nibble mode from said microprocessor to said host machine through said parallel signal line, comprising:

a reverse data register for receiving reverse data having a number of bits greater than the predetermined number of bits from said microprocessor;

a state-transitional signal creating means for creating a state transitional signal based on a particular signal from said host machine; and a data switch for receiving to send onto a bus signal line, a first portion and a second portion of the reverse data respectively having a number of bits smaller than the predetermined number of bits at different timings in response to the state transitional signal, said state-transitional signal creating means controlling the flow of reverse data through said data switch to the host machine without burdening the microprocessor of the ink jet printer.

2. An ink jet printer according to claim 1, wherein said state-transitional signal creating means includes a timer to create the state transitional signal based on the particular signal and an output of said timer.

3. An ink jet printer according to claim 1, further comprising a timing signal giving means for giving, to said host machine, a timing signal for informing a timing at which the first portion and the second portion of the reverse data are to be received by said host machine.

4. An ink jet printer according to claim 2, further comprising a timing signal giving means for giving, to said host machine, a timing signal for informing a timing at which the first portion and the second portion of the reverse data are to be received by said host machine.

5. An ink jet printer, connected to a host machine through parallel signal lines of a predetermined number of bits, and including a microprocessor, wherein reverse data is sent in a nibble mode from said microprocessor to said host machine through said parallel signal lines, comprising:

a reverse data register for receiving reverse data having a number of bits greater than the predetermined number of bits from said microprocessor;

a state-transitional signal creating means for creating a state transitional signal based on a particular signal from said host machine; and a data switch for receiving to send, onto said parallel signal lines, a first portion and a second portion of the reverse data respectively having a number of bits smaller than the predetermined number of bits at different timings which are in response to different outputs of a first state control signal and a second state control signal from said state-transitional signal creating means, said state-transitional signal creating means controlling the flow of reverse data through said data switch to the host machine without burdening the microprocessor of the ink jet printer.

* * * * *